(12) United States Patent
Biro (10) Patent No.: US 7,722,115 B2
(45) Date of Patent: May 25, 2010

(54) METHOD AND APPARATUS FOR BICYCLE SEAT ADJUSTMENT

(75) Inventor: Dominic Biro, Metuchen, NJ (US)

(73) Assignee: Animal Bikes, Inc., Clifton, NJ (US)

( * ) Notice: Subject to any disclaimer, the term of this patent is extended or adjusted under 35 U.S.C. 154(b) by 141 days.

(21) Appl. No.: 12/001,563

(22) Filed: Dec. 11, 2007

(65) Prior Publication Data

US 2009/0146471 A1 Jun. 11, 2009

(51) Int. Cl.
*B62J 1/00* (2006.01)
*B62J 1/10* (2006.01)
*F16B 2/14* (2006.01)

(52) U.S. Cl. .............................. 297/215.15; 297/195.1; 403/374.4

(58) Field of Classification Search .............. 297/195.1, 297/215.13, 215.14, 215.15; 403/109.5, 403/374.4; 74/551.1, 551.3, 551.4; 411/75, 411/79, 80, 78
See application file for complete search history.

(56) References Cited

U.S. PATENT DOCUMENTS

| 606,192 | A | * | 6/1898 | Dayhoff | 74/551.4 |
|---|---|---|---|---|---|
| 2,430,524 | A | * | 11/1947 | Miller | 403/370 |
| 3,006,230 | A | * | 10/1961 | McCauley, Jr. | 411/427 |
| 3,528,691 | A | * | 9/1970 | Matich, Jr. | 403/356 |
| 4,850,733 | A | * | 7/1989 | Shook | 403/104 |
| 5,197,349 | A | * | 3/1993 | Herman | 74/551.1 |
| 5,244,133 | A | * | 9/1993 | Abbott et al. | 224/521 |
| 5,323,664 | A | | 6/1994 | Fairfield et al. | |
| 5,331,865 | A | * | 7/1994 | Oskam | 74/551.3 |
| 5,465,634 | A | * | 11/1995 | Chen | 74/551.3 |
| 5,509,328 | A | * | 4/1996 | Lai | 74/551.3 |
| 5,618,052 | A | | 4/1997 | Rendall | |
| 5,881,988 | A | | 3/1999 | Liu | |
| 6,206,395 | B1 | | 3/2001 | Young | |
| 6,899,389 | B2 | * | 5/2005 | Saccucci | 297/215.15 |
| 7,059,672 | B2 | | 6/2006 | Saccucci | |
| 7,296,813 | B2 | * | 11/2007 | Montague et al. | 280/279 |

* cited by examiner

*Primary Examiner*—David Dunn
*Assistant Examiner*—James Alex
(74) *Attorney, Agent, or Firm*—Lawrence G. Fridman (57) ABSTRACT

In a bicycle seat assembly a fastener driver is rotatable in first and second directions. Upon rotating the driver in the first direction, it threadably engages a shaft of an adjusting member causing tightening of a connection between a bicycle seat, a seat post and the adjusting member and producing simultaneous adjustment of a wedge sub-assembly provided at an interface between a distal end of the adjusting member and the seat post. Rotation of the fastener driver in the second direction causes at least partial disengagement of the threadable connection between the driver and the adjusting member, resulted in loosening connection between the seat post and the adjusting member.

15 Claims, 7 Drawing Sheets

METHOD AND APPARATUS FOR BICYCLE SEAT ADJUSTMENT

FIELD OF INVENTION

The invention relates to bicycles in general, more specifically it relates to a method and apparatus for bicycle seat adjustment.

BACKGROUND OF INVENTION

In the prior art to provide adjustment of a bicycle seat and a bicycle seat post with respect to a bicycle frame, typically one or more bolts are used. An additional independent clamp is also typically provided for securing the bicycle seat post to the tube of the bicycle seat frame.

U.S. Pat. Nos. 6,899,389 and 7,059,672 to Saccucci disclose a bicycle seat assemblies concentrating on the adjustment and fixing the angular position of the seat with respect to the frame. However, these patents neither interested nor capable of providing simultaneous adjustment of the seat/seat post with respect to the frame. A special additional device is required for this purpose.

U.S. Pat. No. 5,618,052 to Rendall disclose an angle-shaped clamp facilitating vertical adjustment of the seat post within the bicycle frame and fixation thereof after the predetermined elevation is achieved. The Rendall Patent requires a separate independent mechanism for angular adjustment position of the seat with respect to the frame.

In both, the Rendall and the Saccucci references there are separate and independent mechanisms are provided for adjustment of the seat with respect to the frame and for adjustment of the post relative to the frame of a bicycle. Provision of two separate mechanisms increases the weight of the bicycle and makes manufacturing of the bicycles more expensive. Furthermore, use of the separate mechanisms complicates adjustment and fixation of the seat as well as adjustment of the seat post within the frame.

Thus, it has been long felt and unsolved need for a bicycle seat arrangement which is capable of providing a simple adjustment of the seat as well as the seat post relative to the frame, wherein both actions are carried out simultaneously by using a single integrated mechanism.

SUMMARY OF THE INVENTION

One aspect of the invention provides a method of adjustment of a bicycle seat assembly which comprises a bicycle seat, and a hollow seat post adapted to receive an elongated adjusting member thereinside. A wedge sub-assembly is formed at an interface between a distal end of the adjusting member and a distal end of the seat post. A fastener driver is associated with the bicycle seat and adapted for engagement with a proximal end of the elongated adjusting member. In the method, the fastener driver is engaged with the proximal end of the elongated adjusting member. Then the fastener driver can be rotated in two opposite directions. Upon rotation of the fastener driver in a first direction tightening connection between the bicycle seat, the seat post and the elongated adjusting member occurs which causes fixing the bicycle seat in a predetermined position. Such rotation in the first direction causes simultaneous tightening of the wedge sub-assembly resulted in fixing position of the seat post within the bicycle frame. Upon rotation of the fastener driver in the second direction loosening of the connection between the bicycle seat, the seat post and the elongated adjusting member occurs allowing repositioning of the bicycle seat. Rotation of the driver in the second direction simultaneously causes loosening of the wedge sub-assembly so as to allow movement of the seat post within the bicycle frame.

As to another aspect of the invention, the engagement between the fastener driver and the proximal end of the adjusting member is a threadable engagement. In this manner, when the fastener driver is rotated in the second direction, a threadable connection is at least partially disengaged and in the step of rotating the fastener driver in the first direction, the threadable connection is engaged. The wedge sub-assembly consists of a wedge-shaped element provided at the distal end of the seat post. The distal end of the adjusting member is formed with a wedge-shaped member adapted for engagement for engaging the wedge-shaped element of the seat post. Upon rotation of the fastener driver in the first direction, the wedge-shaped element and member of the wedge sub-assembly are drawn against each other causing misalignment thereof within the bicycle frame. In this manner, the seat post is fixed within an interior of the bicycle frame.

As to the a further aspect of the invention, upon rotation of the fastener driver in the second direction, an engagement between the wedge-shaped element and member is minimized resulted in the reduced friction between the wedge-assembly and the interior of the frame so as to allow movement of the seat post thereinside.

As to still another aspect of the invention, the bicycle seat assembly further comprises a seat support structure positioned between the proximal end of the seat post and the bicycle seat. Thus, in the step of rotation the fastener driver in the second direction, position of the seat relative to the support structure is adjustable. On the other hand, when the fastener driver is rotated in the first direction, position of the seat with respect to the seat support structure is fixable.

The main purpose of this invention is to reduce the weight of the bicycle and to simplify assembly and adjustment of the bicycle seat. Previously, the bicycle seat is adjusted by using multiple bolts to tighten the seat at the desired angle. Furthermore, in the prior art, an additional single bolt or a pair of bolts are utilized to tighten the seat onto the bicycle frame at the desired height. The present invention utilizes a single fastener driver to simultaneously tighten the angle of the seat as well as the height of the seat post within the bicycle frame. In this manner, only one tool is used to simplify adjustment, removal and or installation of the seat to the bicycle frame. Utilization of the single fastener driver reduces weight of the bicycle and performs the same task.

The design of the bicycle frame associated with the invention eliminates the seat tube or a receptacle extension above the top tube of the bicycle frame. This further reduces the weight and improves the appearance of the bicycle providing the assembly with a better esthetic appearance when installed into the bicycle frame.

BRIEF DESCRIPTION OF THE DRAWINGS

The invention will be further discussed and illustrated in the drawings in which.

DETAILED DESCRIPTION OF THE INVENTION

Figure 1:
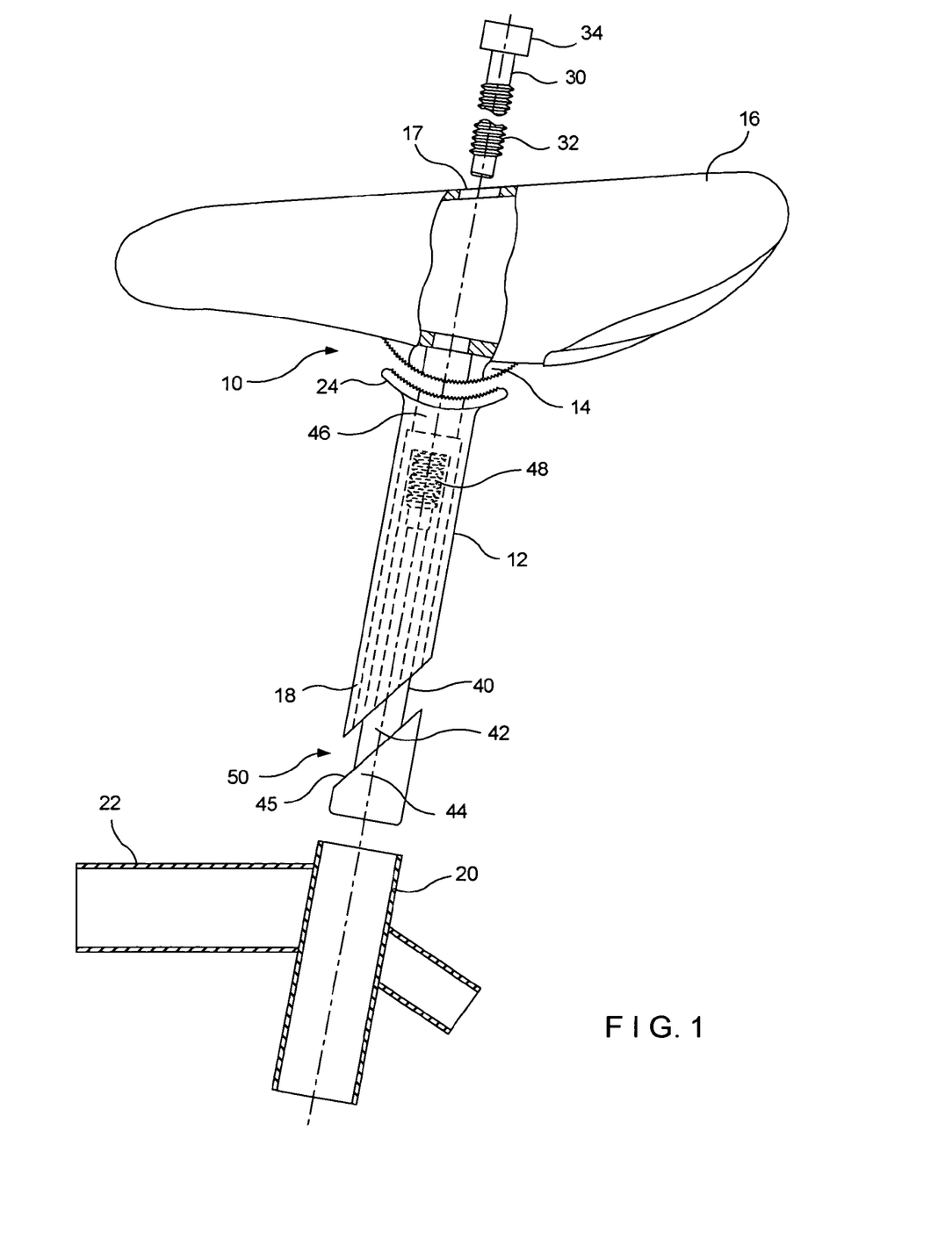
FIG. 1 is a view showing the apparatus for adjustment of bicycle seat assembly of the invention.
Figure 2A:
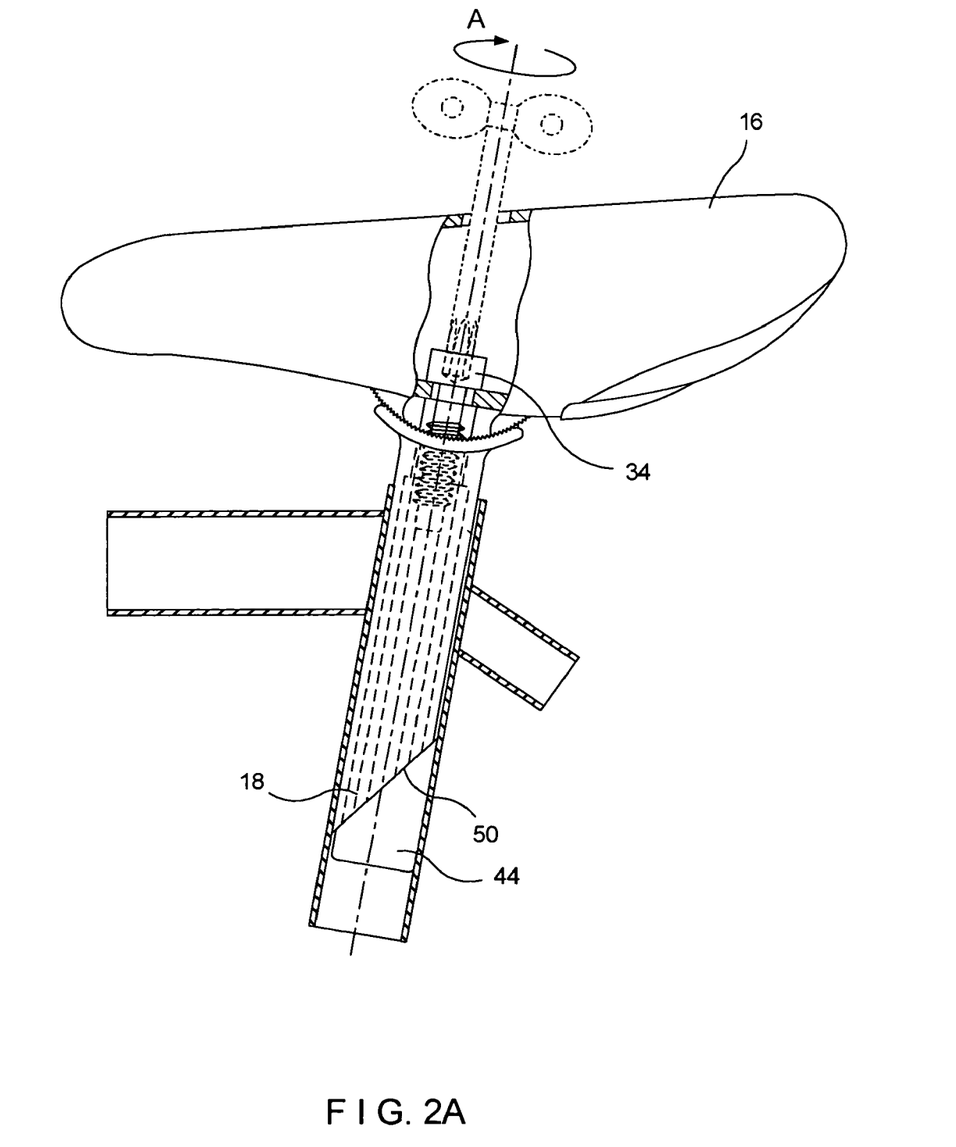
FIG. 2A is a view of the bicycle seat assembly illustrating rotation of a fastener driver in the first direction.
Figure 2B:
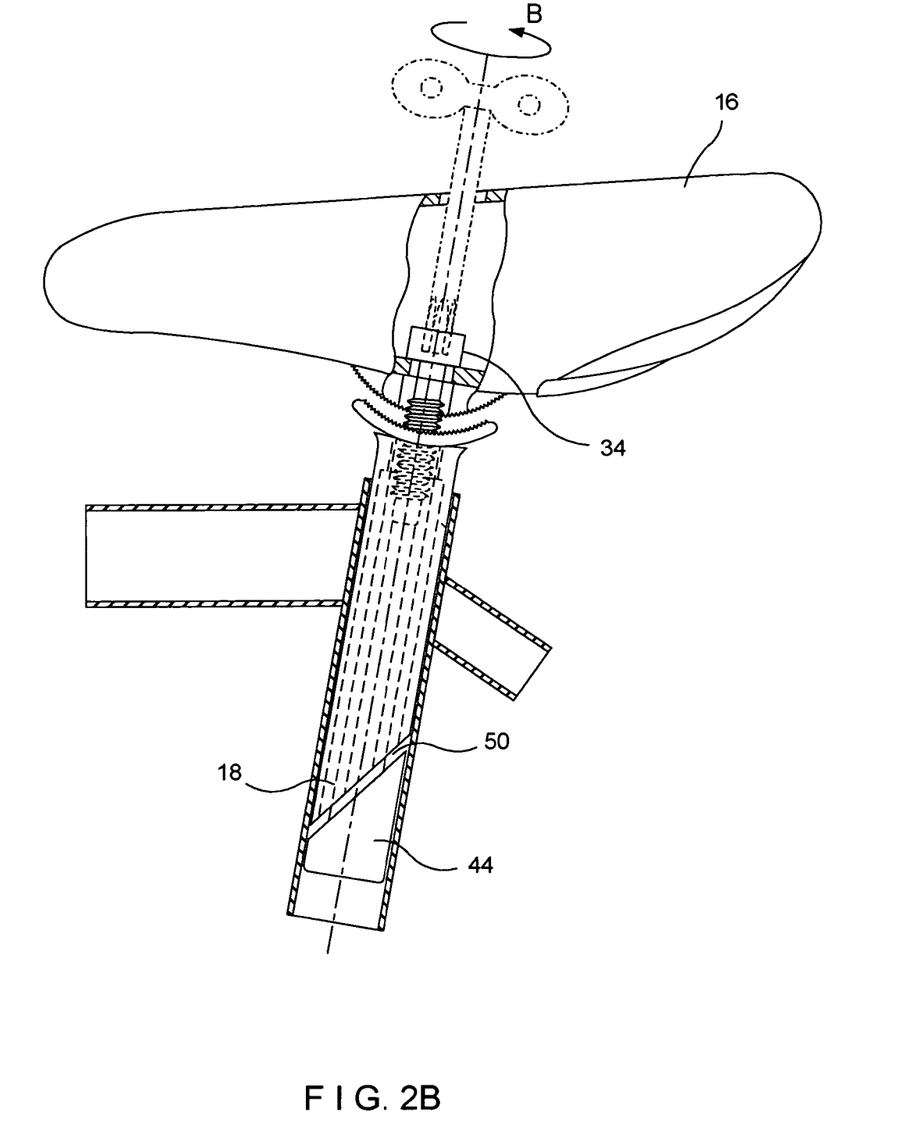
FIG. 2B is a view of the bicycle seat assembly illustrating rotation of a fastener driver in the second direction.
Figure 3:
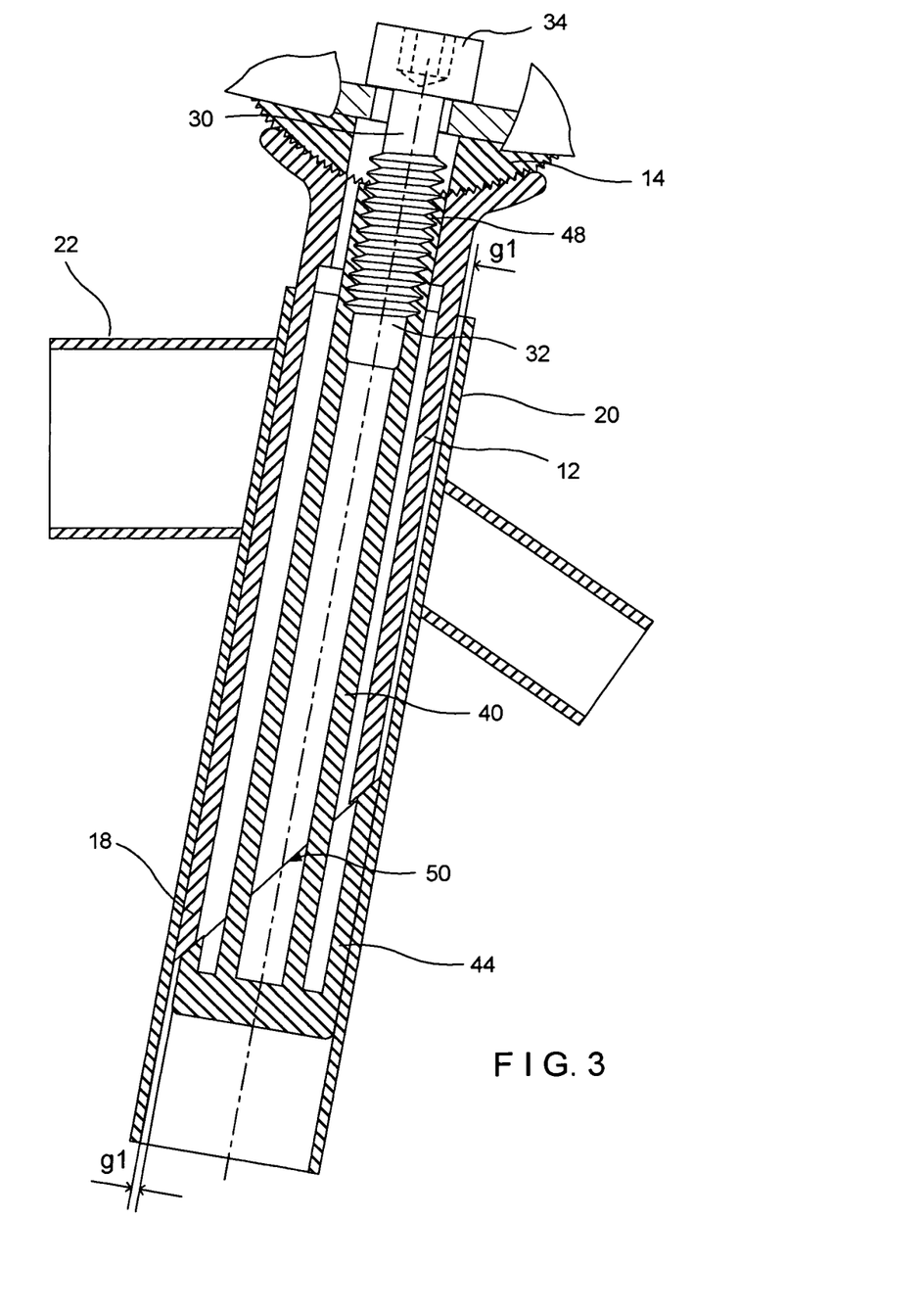
FIG. 3 is a partial section view of the apparatus of the invention.
Figure 4:
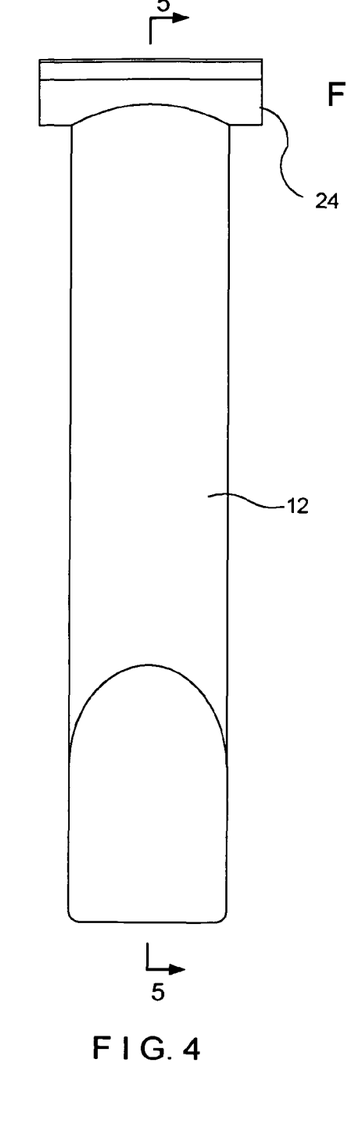
FIG. 4 is a front elevational view of a seat post with an elongated adjusting member.
Figure 5:
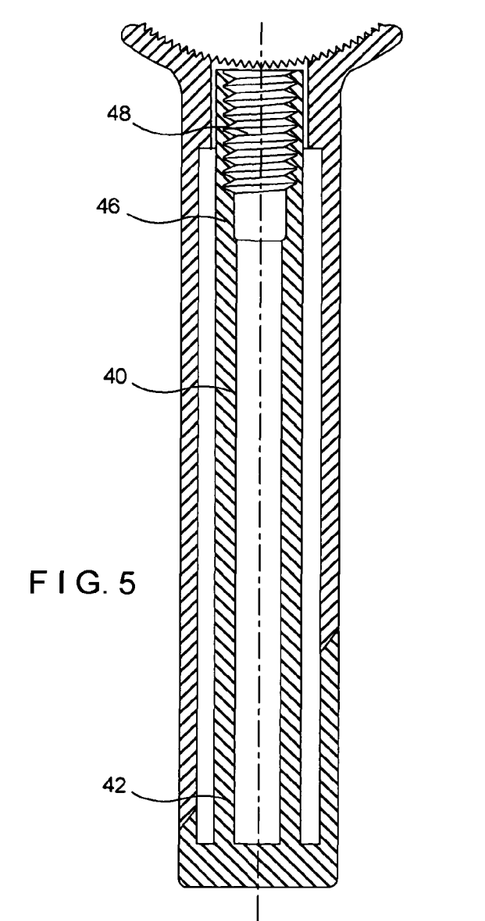
FIG. 5 is a section view according to section line 5-5 of FIG. 4.
Figure 6:
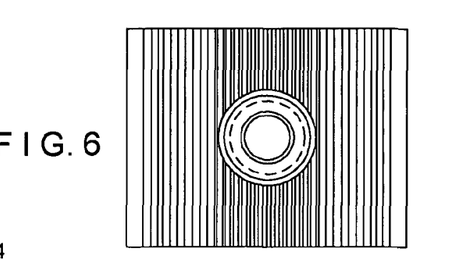
FIG. 6 is a top plan view of FIG. 4.
Figure 7:
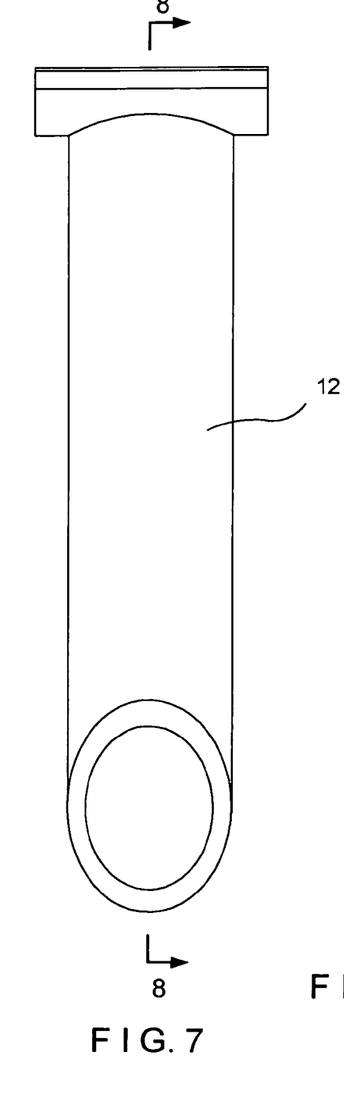
FIG. 7 is a front elevational view of the seat post.
Figure 8:
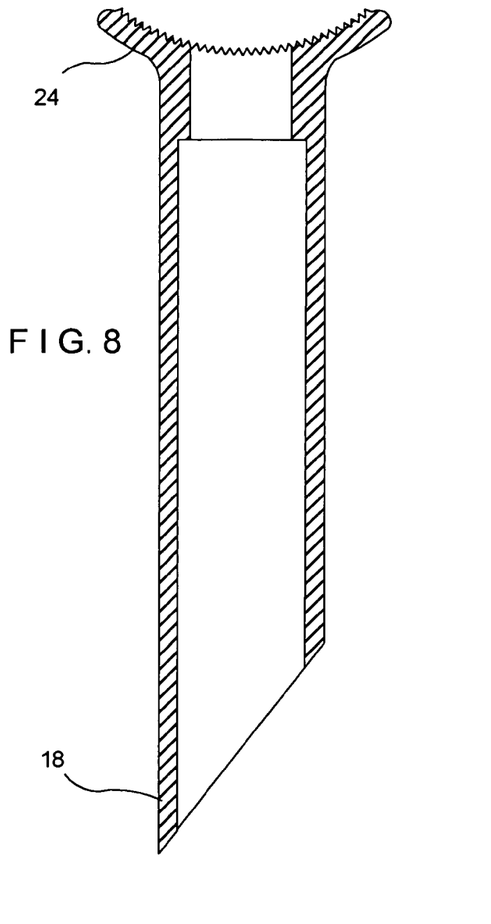
FIG. 8 is a section view according to section line 8-8 of FIG. 7.
Figure 9:
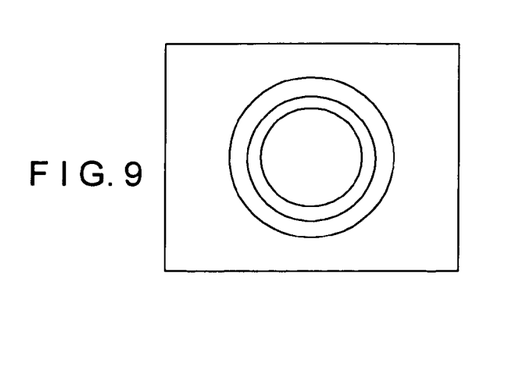
FIG. 9 is a top plan view of FIG. 7.
Figure 10:
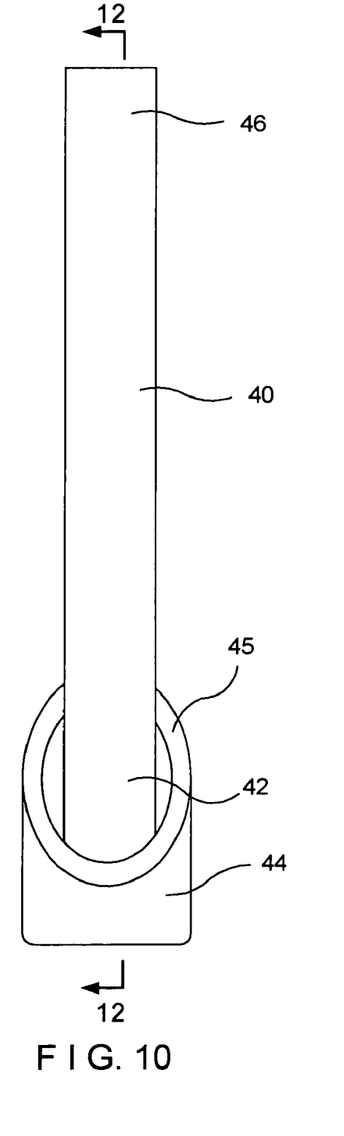
FIG. 10 is a front elevational view of the elongated adjusting member.
Figure 11:
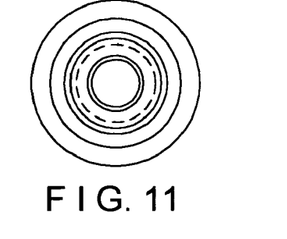
FIG. 11 is a top plan view thereof.
Figure 12:
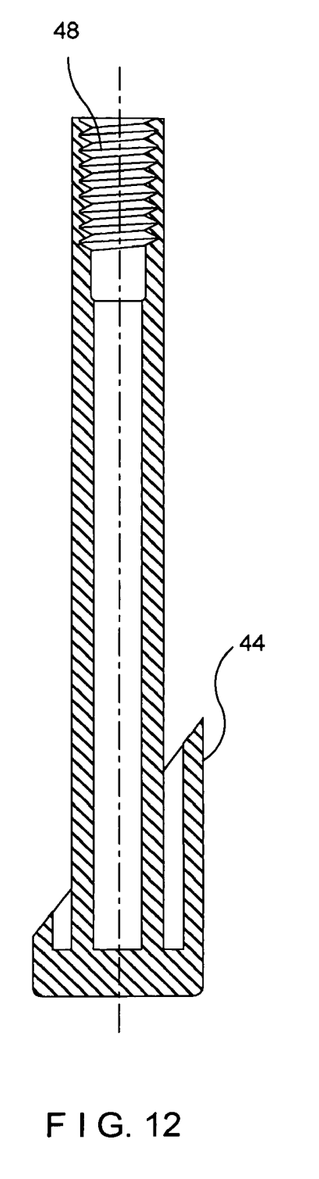
FIG. 12 is a section view according to section line 12-12 of FIG. 10.

Referring now to the drawings in general and more specifically to FIGS. 1-12 which show a bicycle seat assembly 10 in accordance with the present invention. The seat assembly 10 consists of a tubular seat post 12, and a seat sub-assembly which includes a seat support structure 14 and a seat 16. The seat post tube 12 has a distal end 18 adapted to be installed into a tube or receptacle 20 in a bicycle frame 22, and a proximal end 24 provided for connection to the seat support structure. A shaft or adjusting member 40 is formed with a threaded central aperture 48 provided at a top area 46 and extends along a longitudinal axis thereof. In the preferred embodiment, the seat post 12 is substantially hollow and the distal end 18 is formed having wedge-shaped configuration. The elongated adjusting member 40 is movably positioned within the hollow interior of the post tube 12. A bottom area 42 of the adjusting member 40 is formed with a wedge-shaped member 44 adapted for engagement with the wedge-shaped distal end 18 of the seat post 12. In the preferred embodiment of the invention, the member 44 is formed having tubular-shaped configuration with the top angle-shaped portion 45 positioned at an angle to the longitudinal axis of the shaft. The central aperture 48 is formed with internal threads and is adapted to receive a driver or fastener 30 having a threaded stem 32 and a head 34. The external threads of the stem 32 are provided for threadable engagement with the internal threads of central aperture 48. When inserted into the threaded aperture, the fastener 30 is a co-axial relationship with the threaded aperture 48, the adjusting member 40 and the seat post 12. Further, when screwed into the threaded aperture 48 of the adjusting member 40, the fastener 30 is aligned with the longitudinal axis of the seat post 12. Such arrangement maximizes the strength and durability of the seat assembly 10. This is because the fastener 30 is not exposed to any lateral moments (e.g., forces) during use.

A wedge sub-assembly 50 is formed at an interface between the bottom area 42 of the adjusting member and the distal end 18 of the seat post. More specifically, the wedge sub-assembly consists of the wedge-shaped member 44 of the adjusting member adapted for engagement with the wedge-shaped distal end 18 of the seat post. The wedge-shaped distal portion 18 of the seat post 12 can be cut approximately at 37 degree angle at the bottom of the post, so as to accept the wedge-shaped top surface 45 of the adjusting member formed with a mating 37 degree angle. These two angle-shaped members are engaged by tightening the fastening driver 30 associated with the seat. In this manner, the wedge-shaped surface 45 and the wedge-shaped end 18 are forced against one another inside of the seat tube of the bicycle effectively expanding (see FIGS. 2A and 3, for example) and clamping the seat post 12 within the interior of the tube receptacle 20.

During the rotational motion of the fastener driver 30 in the first direction, (illustrated by the arrow A in FIG. 2A) the adjusting member 40 moves longitudinally within the longitudinal aperture 28 of the seat post toward the seat 16. In this manner, the wedge-shaped elements 18 and 44 are drawn against each other causing tightening and misalignment of the sub-assembly 50 within the interior of the tube receptacle 20. This motion causes fixation of the seat post 12 within the receptacle 20. On the other hand, during rotational motion of the fastener driver 30 in the second direction, opposite to the first direction, (illustrated by the arrow B in FIG. 2B) the adjusting member 40 moves longitudinally within the hollow interior of the seat post 12 in the opposite direction, away from the seat 16. Thus, the wedge-shaped elements 18 and 44 are drawn away from each other causing relaxation of the sub-assembly 50, allowing alignment of the wedge-shaped elements 18 and 44 with respect to each other.

One embodiment of the present invention is adapted for use with a seat 16 formed with a slit 17 adapted for passage the fastener driver 30. This arrangement facilitates quick and easy attachment, removal and re-adjustment of the seat 16 and support structure 14 from the seat post 12, or to adjust the seat angle.

Although, the threadable connection between the fastener driver 30 and the adjusting member 26 has been described hereinabove, it should be obvious to a person skilled in the art that any conventional connection between these two elements is within the scope of the invention.

The cross-sectional shape of the seat post tube 12, can be of any conventional configuration. In the illustrated embodiment of the invention, the cross-sectional shape of seat post tube 12 is circular on both its interior and exterior. The cross-sectional shape of seat post may also be non-circular, and may include shapes such as ellipsoidal, square, rectangular, triangular, and higher order polygonal shapes.

The seat post 12 can be made from any strong, durable, and lightweight material including, for example, a composite material, aluminum, alloys, titanium, or other materials, and can be of any dimensions suitable for use with a bicycle.

In the method of the invention, there are two independent functions accomplished by engaging and the fastener driver 30 within the central aperture 28 of the adjusting member. Upon insertion of the rotating tool into the head 34 (shown in phantom in FIGS. 2A and 2B), rotation of the fastener driver 30 in the first direction (according to the arrow A) causes tightening connection between the bicycle seat, the seat post and the elongated adjusting member, so that the bicycle seat is fixed in a predetermined position. Simultaneously, tightening of the wedge sub-assembly 50 occurs resulted in fixing position of the seat post 12 within the bicycle frame. More specifically, during the rotational motion of the fastener driver 30 in the first direction, the wedge-shaped elements 18 and 44 are drawn against each other causing misalignments thereof within the interior of the tube receptacle 20. As a result, frictional engagement of the wedge sub-assembly fixably attaches the seat post 12 at a predetermined elevation or angular position with the receptacle 20 of the frame 22.

When the fastener driver 30 is rotated in the second direction (see the arrow B in FIG. 2B), a connection between the adjusting member 12, the seat post 12 and seat 16 is loosened. This allows repositioning of the seat with respect to the seat post. Simultaneously, a wedging action between wedge-shaped elements 18 and 44 is loosened. Thus, the wedge-shaped elements 18 and 44 are aligned with respect to each other. This reduces friction between the wedging mechanism and to the interior of the frame, facilitating motion of the seat post 12 within the inner space of the frame receptacle 20.

One of the essential features of the method of invention is that a single operational step which is based on a single integrated mechanism, is used not only for adjustment of the position of the seat 16 relative to the seat post 12 and the bicycle frame receptacle 20, but also provides simultaneous adjustment of the seat post position relative to the bicycle frame receptacle.

Thus, the method and device of the invention do not require two independent mechanisms for angular adjustment of the seat with respect to the seat post and another mechanism for adjustment and fixation of the seat post within the bicycle frame.

The seat assembly 10 of the invention includes a minimum number of parts, which advantageously reduces manufacturing costs as well as labor costs associated with assembly. For example, reducing the labor costs associated with simultaneous adjusting of the seat assembly and seat post allows a bicycle shop or manufacturer to spend minimal time on these operations, and advantageously reduces overhead. Also, the reduced number of parts minimizes the weight of seat assembly 10, and provides riders with further important competitive advantages.

By utilizing the device and method of the invention, an operator can easily adjust the angle of seat 16 and simultaneously elevate the seat post with respect to the bicycle frame by simply inserting an elongated wrench (not shown) through the slit in the seat 16 to engage and rotate the fastener 30, loosening the fastener and allowing re-positioning of the seat 16 so as to achieve a desired angle. At the same time, the wedge-shaped sub-assembly 50 is also being loosened allowing adjustment of the seat post within the bicycle frame 20 and 22. When the fastener 30 is tightened, the seat 16 and support structure 14 are securely attached to the seat post 12 in the pre-selected position. Simultaneously, the seat post is fixed within the frame receptacle 20.

What is claimed is:

1. A method of adjustment of a bicycle seat assembly, wherein said bicycle assembly comprises a bicycle seat, a hollow seat post receiving an elongated adjusting member thereinside, a wedge sub-assembly formed at an interface between a distal end of the adjusting member and the seat post, a fastener driver associated with the bicycle seat and adapted for engagement with a proximal end of the elongated adjusting member, said method comprising the steps of:

engaging the fastener driver with the proximal end of the elongated adjusting member;

rotating the fastener driver in a first direction causing tightening of a connection between the bicycle seat, the seat post and the elongated adjusting member and fixing the bicycle seat in a predetermined position, said rotation causing simultaneous tightening of the wedge sub-assembly resulted in fixing a position of the seat post within a bicycle frame; and rotating the fastener driver in a second direction opposite to the first direction, so as to cause loosening the connection between the bicycle seat, the seat post and the elongated adjusting member, to allow repositioning of the bicycle seat and to cause simultaneous loosening of the wedge sub-assembly resulting in movement of the seat post within the bicycle frame;

wherein said engagement between the fastener driver and the proximal end of the adjusting member is a threadable engagement, so that in said step of rotating the fastener driver in the second direction, the threadable engagement is at least partially disengaged and in said step of rotating the fastener driver in the first direction said threadable engagement is fully engaged.

2. The method according to claim 1, wherein said wedge sub-assembly consists of a wedge-shaped element provided at the distal end of the seat post, the distal end of the adjusting member is formed with another wedge-shaped element adapted for engagement with the wedge-shaped element of the seat post.

3. The method of claim 2, wherein during said step of rotating the fastener driver in the first direction the wedge-shaped elements of the wedge sub-assembly are drawn against each other causing misalignment thereof within the bicycle frame, so as to fix the seat post within an interior of the bicycle frame.

4. The method according claim 3, wherein during said step of rotating the fastener driver in the second direction an engagement between the wedge-shaped elements is minimized resulted in reduction of friction between the wedge sub-assembly and the interior of the frame so as to allow movement of the seat post.

5. The method according to claim 1, wherein the bicycle seat assembly further comprises a seat support structure provided between the proximal end of the seat post and the bicycle seat, wherein in said step of rotating the fastener driver in the second direction a position of the seat relative to the seat support structure is adjustable, and in said step of rotating the fastener driver in the first direction the position of the seat with respect to the seat support structure is fixable.

6. The apparatus for adjustment of a bicycle seat assembly comprising:

a seat sub-assembly including at least a seat and a seat support structure facilitating adjustment of angular position of the seat relative to a bicycle frame;

a seat post having a tubular configuration extending between top and bottom areas thereof, the bottom area adapted for insertion into a central upright hollow frame member of the bicycle frame and the top area connected to the seat support structure;

an adjusting member adapted for cooperation with an inner space of the tubular seat post and the central upright frame member, said adjusting member comprising a hollow shaft extending between proximal and distal ends thereof and a wedge-shaped element connected to the shaft at the distal end, a threadable internal engaging formation provided in the hollow inner proximal end of the elongated shaft;

a fastener driver associated with the seat sub-assembly and passing through the seat support structure, said fastener driver provided with a threadable external engaging formation adapted for engaging cooperation with the internal engaging formation of the elongated shaft;

whereby rotational motion of the fastener driver within the seat support structure in a first direction causes threadable engagement between the threadable external and internal formations resulted in connection between the seat sub assembly, the seat post and the adjusting member, so as to lock a predetermined angular position of the seat sub-assembly relative to the frame and to provide simultaneous tightening of the wedge-shaped member against the bottom area of the seat post and fixing position of the seat post within the upright member of the bicycle frame.

7. The apparatus according to claim 6, wherein rotational motion of the fastener driver in a second direction causes a loosening connection between the seat sub-assembly, the seat post and the adjusting member; and also causes simultaneous loosening of the wedge sub-assembly allowing movement of the seat post within the bicycle frame.

8. The apparatus according to claim 6, wherein the threadable internal engaging formation of the elongated shaft is in the form of internal threads formed at the hollow inner proximal end thereof, the threadable external engaging formation of the fastener driver is in the form of external threads, so that during the rotation motion of the fastener driver, the external threads of the driver engage the internal threads of the elongated shaft.

9. The apparatus according to claim 8, wherein the engagement between the fastener driver and the hollow proximal end of the shaft is a threadable engagement, so that upon a rotation of the fastener driver in the first direction the threadable engagement is fully engaged, and upon rotation the fastening driver in a second direction opposite to the first direction, the threadable connection is at least partially disengaged.

10. The apparatus according to claim 8, wherein a wedge-shaped element is provided at a lower end of the seat post and the wedge-shaped element of the adjusting member is adapted for engagement with the wedge-shaped element of the seat post.

11. The apparatus according to claim 10, wherein during the rotation motion of the fastening driver in the first direction, the wedge-shaped elements are drawn against each other causing misalignment thereof within an interior of the upright member of the bicycle frame so as to fix the seat post thereinside.

12. The apparatus according to claim 11, wherein during the rotational motion of the fastener driver in the second direction engagement between the wedge-shaped elements is minimized causing mutual alignment thereof within the upright member of the bicycle frame.

13. The apparatus according to claim 6, wherein the adjusting member, fastener driver and the seat post are coaxial.

14. The apparatus according to claim 6, wherein the shaft is formed with an inner hollow space extending between the distal and proximal ends along a longitudinal axis of the adjusting member, with the threadable internal engaging formation provided at the proximal end of the inner hollow space.

15. The apparatus according to claim 6, wherein the fastener driver is inserted into the inner hollow space of the shaft for the threadable engagement between the external and internal engaging formations.

* * * * *